United States Patent
Freed et al.

(10) Patent No.: US 9,984,105 B2
(45) Date of Patent: May 29, 2018

(54) AUTOMATIC DISCOVERY OF CODE AND DATA STORES THAT POPULATE A USER INTERFACE ELEMENT

(71) Applicant: International Business Machines Corporation, Armonk, NY (US)

(72) Inventors: Andrew R. Freed, Cary, NC (US); Curtiss J. Howard, Cary, NC (US); Saul B. Margolis, Cary, NC (US); Dorian B. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 14/560,689

(22) Filed: Dec. 4, 2014

(65) Prior Publication Data

US 2016/0162527 A1  Jun. 9, 2016

(51) Int. Cl.
G06F 17/30  (2006.01)

(52) U.S. Cl.
CPC .. G06F 17/30327 (2013.01); G06F 17/30958 (2013.01)

(58) Field of Classification Search
None
See application file for complete search history.

(56) References Cited

U.S. PATENT DOCUMENTS

| | | | |
|---|---|---|---|
| 7,653,880 B2 * | 1/2010 | Peters | G06F 8/38 715/762 |
| 7,765,097 B1 | 7/2010 | Yu et al. | |
| 7,831,918 B2 * | 11/2010 | Marini | G06F 8/38 715/762 |
| 8,381,113 B2 | 2/2013 | Kamdar et al. | |
| 8,566,780 B2 * | 10/2013 | Tolskyakov | G06Q 30/00 717/104 |
| 9,230,351 B2 * | 1/2016 | Dodgen | G06T 11/206 |
| 9,286,041 B2 * | 3/2016 | Rioux | G06F 8/53 |
| 9,483,240 B1 * | 11/2016 | Boyar | G06F 8/38 |

(Continued)

OTHER PUBLICATIONS

Shepherd, D., et al., "Using Natural Language Program Analysis to Locate and Understand Action-Oriented Concerns", AOSD, 07, Mar. 12-16, 2007, 13 pages, Vancouver, Canada.

(Continued)

*Primary Examiner* — Jeff A Burke
(74) *Attorney, Agent, or Firm* — Scully, Scott, Murphy & Presser, P.C.; Diana R. Gerhardt (57) ABSTRACT

Automatically discovering application components that populate a user interface element may be provided. A directed graph may be built from an application code implementing a backend layer of an application. A code element in the application code may be identified that matches an input element of a user interface of the application. A data store element of a data store implementing data layer of the application may be identified that matches the input element. For the input element, a map of trees may be built tracing through the directed graph based on the code element and the data store element that are identified. The map of trees may be grouped based on at least matching of annotations of the trees in the map, a similarity of begin and end points of the trees in the map and matching of the end points of the trees in the map.

17 Claims, 4 Drawing Sheets

(56) References Cited

U.S. PATENT DOCUMENTS

| | | | | |
|---|---|---|---|---|
| 2004/0264367 | A1* | 12/2004 | Edwards | G06F 8/433 370/229 |
| 2005/0203955 | A1* | 9/2005 | Ramaswamy | G06F 8/433 |
| 2006/0048093 | A1* | 3/2006 | Jain | G06Q 10/06 717/104 |
| 2007/0074130 | A1* | 3/2007 | Folting | G06F 17/246 715/792 |
| 2010/0023926 | A1* | 1/2010 | Sugawara | G06F 8/75 717/120 |
| 2012/0054255 | A1* | 3/2012 | Buxbaum | G06F 11/3476 708/235 |
| 2012/0159452 | A1* | 6/2012 | Deline | G06F 8/34 717/125 |
| 2012/0311471 | A1* | 12/2012 | Bullard | G06F 3/048 715/765 |
| 2013/0226945 | A1 | 8/2013 | Swinson et al. | |
| 2013/0268916 | A1* | 10/2013 | Misra | G06F 8/74 717/123 |
| 2014/0082582 | A1* | 3/2014 | Houck | G06F 8/30 717/101 |
| 2014/0215344 | A1* | 7/2014 | Ligman | H04L 67/22 715/736 |
| 2014/0310273 | A1* | 10/2014 | Mital | G06F 17/246 707/736 |
| 2015/0121349 | A1* | 4/2015 | Abadi | G06F 8/433 717/132 |
| 2016/0092425 | A1* | 3/2016 | Shah | G06F 17/248 715/760 |

OTHER PUBLICATIONS

Pollock, L., et al., "Natural Language-Based Software Analyses and Tools for Software Maintenance", Software Engineering, Lecture Notes in Computer Science, 2013, pp. 94-125, vol. 7171.

Pollock, L., et al., "Introducing Natural Language Program Analysis", Conference: Proceedings of the 7th ACM SIGPLAN-SIGSOFT Workshop on Program Analysis for Software Tools and Engineering, PASTE'07, Jun. 13-14, 2007, 2 pages, San Diego, California.

"NLPA: Natural Language Program Analysis", http://hiper.cis.udel.edu/doku.php/projects/nlpa, printed on Aug. 26, 2014, 2 pages.

Microsoft, "Windows Embedded Compact, Populating a Silverlight for Windows Embedded UI with Collections of Data", Published: Jan. 2012, 32 pages, Applies to: Windows Embedded Compact 7.

Shepherd, D., "Natural Language Program Analysis: Combining Natural Language Processing With Program Analysis to Improve Software Maintenance Tools", dissertation submitted to the Faculty of the University of Delaware, Summer 2007, 176 pages.

* cited by examiner

AUTOMATIC DISCOVERY OF CODE AND DATA STORES THAT POPULATE A USER INTERFACE ELEMENT

FIELD

The present application relates generally to computers and computer applications, and more particularly to automatic discovery of the code and data stores that populate a user interface element.

BACKGROUND

When working on a new code base, particularly a large one, it is difficult to track execution of the code from interactions "on the glass" through the backend, to the end user once more. Even in a nicely architected application, there will be many different data flows for populating one interface field versus another. It is not easy to determine how a user interface (UI) field gets populated or updated. Typical solutions to this problem involve building a clear architecture to start with, manually writing reams of documentation (which are difficult to find and quickly get outdated), or telling our intrepid developer "just use the search in your IDE". There are no automated approaches that make tracking data through an application easier. The business value is greatly reduced time to debug an application by being able to trace flow across many application layers.

BRIEF SUMMARY

A method and system of automatically discovering application components that populate a user interface element may be provided. The method, in one aspect, may comprise building a directed graph from an application code implementing a backend layer of an application. The method may also comprise identifying a code element in the application code that matches an input element of a user interface of the application. The method may also comprise identifying a data store element of a data store implementing data layer of the application that matches the input element. The method may further comprise, for the input element, building a map of trees tracing through the directed graph based on the code element and the data store element that are identified. The method may also comprise grouping, the map of trees based on at least matching of annotations of the trees in the map, a similarity of begin and end points of the trees in the map and matching of the end points of the trees in the map. The map of trees may include the application components the processor visited for populating the input element of the user interface.

A system for automatically discovering application components that populate a user interface element, in one aspect, may comprise a processor and a discovery module executing on the processor. The discovery module may be operable to build a directed graph from an application code implementing a backend layer of an application. The discovery module may be further operable to identify a code element in the application code that matches an input element of a user interface of the application. The discovery module may be further operable to identify a data store element of a data store implementing data layer of the application that matches the input element. For the input element, the discovery module may be further operable to build a map of trees tracing through the directed graph based on the code element and the data store element that are identified. The discovery module may be further operable to group the map of trees based on at least matching of annotations of the trees in the map, a similarity of begin and end points of the trees in the map and matching of the end points of the trees in the map. The map of trees may include the application components visited by the processor for populating the input element of the user interface.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Techniques or methodologies are described for identifying a flow of data in an application, for example, a flow of data in a traditional n-tier application or another application, starting with user input and following the flow of that data to the back-end and back to the user. Natural Language Processing (NLP) techniques may be used to identify such flows.

A traditional process may identify an application flow manually, for example, by post-development inspection or by asking developers to maintain details in a central repository. Such manual procedures may be time consuming. Another traditional process may identify an application flow automatically, but only after code standardization is enforced. Such standardization may include the use of naming conventions or coded annotations. Such procedure may require development oversight for new projects and may require rework for old projects that do not comply with the standards.

NLP techniques used in the present techniques for identifying a flow of data in an application may provide the benefit of automation without requiring standardization or rework. NLP processing is useful, for example, when it is not obvious how two application layers are connected, for instance, if Representational State Transfer (REST) Uniform Resource Locators (URLs) are built via string concatenation. In one aspect, if an application uses an annotation system or methodology that is understood (for example, by a technique of the present disclosure) in its code, the technique of the present disclosure may trace through the application code without using NLP. However, NLP may help in tracing through an application code that might use annotation system that has not yet been analyzed.

In the following description, for the purpose of simplicity and explanation, the data flow is followed through a typical application that includes a data layer, a backend service, and a user interface (UI) layer. However, it should be noted that the methods and/or systems described herein are not intended to be exhaustive but rather illustrative.

A methodology in one embodiment of the present disclosure includes finding a match of an input field, for example, of a user interface (of the application's UI layer), to a data-layer counterpart. For example, a data layer of an application may include a data store or database (DB) that stores the data used in the application. The methodology in one embodiment may examine the data layer for relevant metadata, for example, examine a database's data definition language (DDL) of the data layer, read and analyze comma-separated values or character-separated values (CSV) column header, or perform another technique to examine the data layer for metadata that are related to the input fields of the user interface layer.

If a direct match to an input field is found by using an exact word match, the methodology of the present disclosure in one embodiment assigns the highest possible "match score", indicating that the methodology has linked an input field to its data layer counterpart. Otherwise, the methodology in one embodiment assigns match scores by using other NLP-based techniques, for example, reviewing synonyms or considering the part of speech. These match scores can be augmented, for example, with similarity of the data type (e.g., java.util.Date to database "date/timestamp", java.lang.String to varchar(30)) and similarity in the name of field, for example, "customer" and "patient" are both people and a probable match to a type Person. Higher match scores correlate with higher confidence that a match between an input field and its data layer counterpart has been found.

The methodology of the present disclosure in one embodiment also builds a directed graph from the code that makes up the backend layer. In one embodiment, the code is ingested according to structured rules, parsed as if by a compiler. The methodology of the present disclosure may determine the method calls in the application code from that graph.

The methodology of the present disclosure in one embodiment also links or ties the data layer to the backend layer. This can be done by further examining the source code graph and its node contents (e.g., method bodies) for potential matches with known data layer metadata using NLP or other techniques and assigning a match score. For example, such known data layer may be obtained from the database schema for applications using a database (DB), or for example, from the data file structure in the case of other inputs (e.g., CSV headers, an extended markup language (XML) schema. For instance, the methodology of the present disclosure in one embodiment may match tables and/or columns in a database to objects and/or fields in a code layer. The methodology of the present disclosure in one embodiment also may match objects and/or fields from one code layer to objects and/or fields in another code layer. For instance, a typical application may include a database (DB), a JAVA™ business object layer (e.g., backend code), and a Javascript UI (e.g., user interface code). The methodology of the present disclosure in one embodiment may trace data flowing from DB to JAVA™, then from JAVA™ to Javascript. With the existing integrated development environments (IDEs), such tracing may be exceptionally difficult to do.

When completed, a map of backend code of the application (the code of the application that provides the backend service) to the data it modifies in the data layer of the application is produced.

Figure 1:
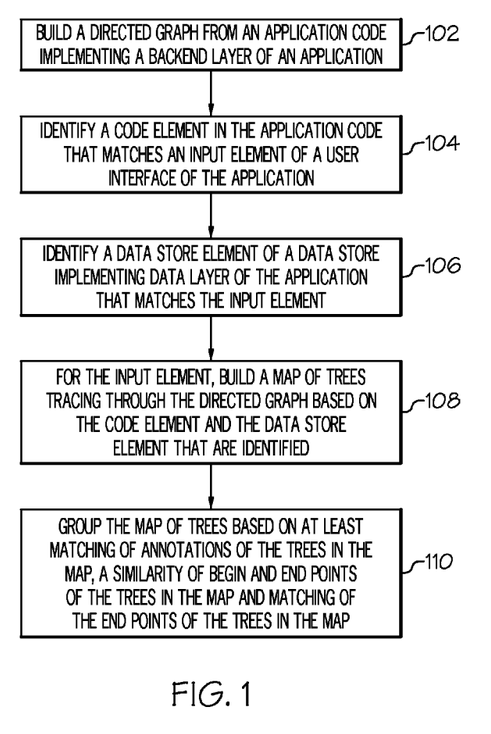
FIG. 1 is a flow diagram illustrating a method of automatically discovering application components, e.g., application code and data store, that populate a user interface element in one embodiment of the present disclosure.

FIG. 1 is a flow diagram illustrating a method of automatically discovering application components, e.g., application code and data store, that populate a user interface element in one embodiment of the present disclosure. The following method may be performed for one or more input elements in a UI layer. One or more input elements in a UI layer may be identified, for example, from a UI layer code or a metadata associated with UI form that presents or displays the input elements.

At 102, a directed graph may be built from an application code that makes up the backend layer of the application. A directed graph may be built for a user interface layer of the application. For instance, directed graphs may be built for different layers of the application code. For example, an application may include a user interface code that provides user interface or client service, an application code that makes up the backend layer of the application for providing backend services, and data store or data layer that includes data used in the application. The application code may be ingested according to structured rules, e.g., like a compiler reading a code to interpret the code, e.g., a JAVA™ compiler reading JAVA™ code. A directed graph including all methods in the code is built. The directed graph also includes methods that call other methods, e.g., a flow of method calls. Nodes of the graph represent methods and the edges between the nodes represent a method calling another method.

At 104, the method includes finding input elements in code sources. For example, input elements in the application code are identified. The input elements are those elements or input fields in the UI layer of the application. The matching elements in the application code that match the input elements are identified. The matching may be based on a similarity score computed as described below, and may be determined based on a code element meeting a threshold similarity score.

In one embodiment, the application code may be read as a standard document corpus. Code elements may be transformed or annotated based on reading camel case, using word expansion using a dictionary, and other one or more techniques. For example, camel case refers to the practice of writing compound words, in which the words are joined without spaces between the words and are capitalized within the compound. For example, an element in an application code written in camel case such as 'updatePatientDetails' may be transformed or annotated as 'update patient details'. As another example, an element in an application code written with abbreviation such as 'idx' may be transformed or annotated with word expansion using a dictionary or like, as 'index'.

NLP analysis may be used to match elements to fields in the code. The NLP analysis may include finding exact word matches, synonyms and type similarity. For example, 'startDate' and 'beginDate' are both dates. The words 'start' and 'begin' are interpreted by NLP analysis as synonyms.

In one embodiment of the present disclosure, the matching elements in the code (that match the input elements) are annotated with similarity scores. For instance, a UI input element 'start date' may be matched with a code element 'beginDate', for example, using the above-described technique of transforming camel case and using NLP analysis to match the UI element with a code element.

The similarity score may be also augmented with Type Coercion similarity. For instance, "Patient" is a person type. For example, if the code declares element 'Patient' in the code as a person type, and the input element is of type Person, then the similarity score may be increased to indicate that there is higher likelihood of a match.

While reading the code, the terms or elements in the code (also referred to as code element) that match input element names may be annotated, for example, by word match, NLP similarity, and/or another technique. A similarity score may be assigned to a code element based on a degree of matching. For each input element, the element in the code having the highest similarity score may be selected and used in the following process. For instance, the above similarity analysis may find several elements in the code that are determined to be similar to an input element. In that case, the code element with highest similarity score may be selected.

At 106, the methodology in one embodiment includes finding input elements in backend sources. For example, data store elements in a data layer of the application that match the input elements of the UI layer are identified. For example, metadata sources may be discovered from a DDL of database, by examining CSV column headers, and by other techniques. Matching of input elements to data store elements may be performed by using known annotations, for example, JAVA™ Persistent API (JPA) entity or column mappings. API refers to Application Programming Interface. In addition, as described above, NLP analysis such as exact word matching, synonyms and type similarity may be used to match input elements to database fields of the data store. Similarly, a similarity score may be assigned to the matching data store elements. In cases where there are more than one data store element matching one input element, the data store element with the highest similarity score may be selected and used.

At 108, for every input element, one or more maps of flows or trees may be built through the code layer to the database layer. For example, for each input element, the matching code element in the application code and the matching data store element are traced through the directed graph. For example, a map of flows is built that includes the methods and their flows in the directed graph, which methods include the matching code element and the matching data store element.

For instance, there may be a "getPatientDetails" method that goes through "sanitizeInput", "initiateConnection", and ends with "getPatientFromDatabase". Note that the tree may have methods that have nothing to do with patients directly, but these methods could still be affecting the output of this tree. That is, as an example, the "initiateConnection" method may be a generic method that fetches database configuration details. In that example, these details are not specific to the Patient object or data being accessed, rather all database calls may run through this method. In the example, that method will ultimately help fetch a Patient object from the database but it will not alter the Patient object in any way.

The map of flows or trees may include a plurality of disconnected trees. For example, the map of flows may include a javascript (UI) tree, a servlet-based JAVA™ tree, and a backend-based JAVA™ tree. These trees may be disconnected in that there may be no direct connection. For example, javascript calls a REST service "http://localhost/patient/get/id", which ultimately is received by a Patient-Details servlet.

At 110, similar trees may be grouped together by analyzing begin and end points of trees. Grouping may include linking the trees together by matching annotations. For instance, a UI tree endpoint (view.jsp) has a REST call to '/patient/get', and REST Servlet (PatientServlet.java) has a JAX-RS mapping to '/patient/get'. Thus, for this input element associated with 'patient', the view.jsp may be linked to PatientServlet.java. In this way the root of a UI tree (corresponding to UI code) may be connected to a leaf of a JAVA™ tree (corresponding to a backend code layer). There may be directed graphs for each code layer. In this example, there are a series of JSP graphs and JAVA™ graphs.

Figure 3:
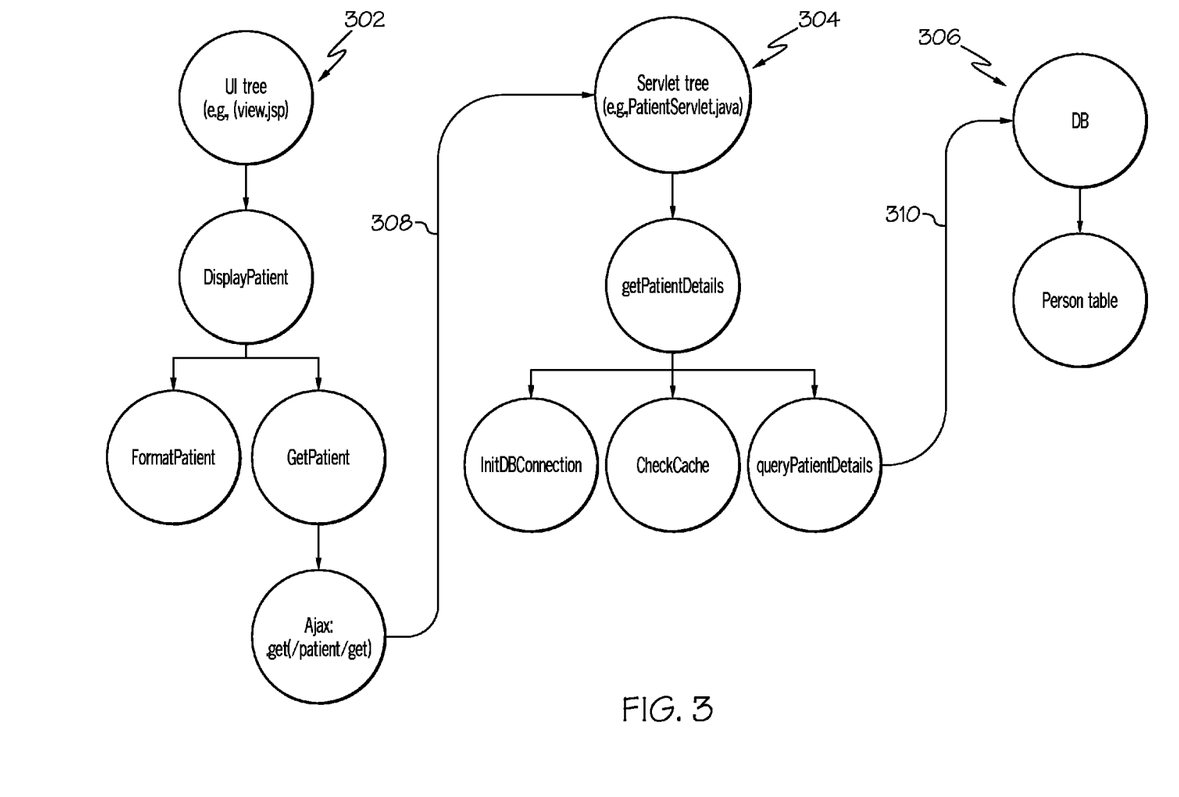
FIG. 3 is a diagram illustrating an example of a map of trees in one embodiment of the present disclosure.

FIG. 3 is a sample diagram showing an example of a map of trees generated according an embodiment of a methodology in the present disclosure. The example diagram shows a UI tree 302, a servlet tree 304, and a database object tree 306. The UI tree, for example, may be written in Javascript. A View page of a UI may have several methods in it. A tree is created from view.jsp. View.jsp calls DisplayPatient. DisplayPatient calls GetPatient and FormatPatient. GetPatient makes an ajax call to '/patient/get' which a methodology in the present disclosure in one embodiment links to the servlet tree 304 as shown at 308. Briefly, ajax refers to asynchronous JavaScript+XML, e.g., for creating a web application and which may be used for requesting data at a client computer from a server computer. In the servlet tree 304, '/patient/get' is mapped to a PatientServlet which gets patients. The servlet calls getPatientDetails which calls InitDBConnection, CheckCache, and queryPatientDetails. The queryPatientDetails method ultimately calls the database layer. This links is shown at 310. A methodology of the present disclosure performs the linking of 'Ajax: .get(/patient/get)' in the UI tree 302 to the servlet tree 304 and 'queryPatientDetails' in the servlet tree 304 to the database tree 306 as shown by the "curved arrows" 308 and 310, which connect the disparate trees 302, 304, 306. FIG. 3 is only one example of a map of trees, for example, built for an input element. A map of trees may be built for one or more input elements of a UI, for example, for each input element of a UI.

Grouping may also include matching endpoints of the trees for type and/or name similarity. For example, a servlet-tree has a 'getPatientDetails' method that returns 'PatientDetails' object, backend-tree has a 'queryPatientDetails' method that returns a 'PatientDetails' object. In this case, the servlet-tree and the backend-tree may be linked or grouped.

The map of trees includes the application components that populate the input element of the user interface. At 112, visualization may be built using the map of trees that are built and grouped. The visualization provides a view of all the places visited (by a UI field) in the application layer and the data layer when a given UI field is displayed. The visualization, for example, visualizes the flow of the methods and the data store (e.g., database tables), in which the UI field has been used in displaying a particular user interface field.

Consider the following example. A 'Patient Details' form displays 'Name', 'Birthday', 'Address' fields. A servlet layer has 'getPatientDetails' method which returns a 'PatientDetails' bean. 'getPatientDetails' in the servlet layer calls a remote data access service.

The remote data access service includes 'DataAccessService.queryPatientDetails' which returns a 'PersonDetails' object and executes the following query:

select fullName,dateOfBirth, address from Person, PersonAddress where id=?
PersonDetails.setName(fullName)
PersonDetails.setBirthday(dateOfBirth)
PersonDetails.setAddress(address).

A methodology of the present disclosure in one embodiment as described above may produce the following correlations as examples:
1. DB/code Person<=>UI Patient (patient is a person)
2. DB fullName<=>code/UI name (full name/name are similar, same Lexical Answer Type (LAT))
3. DB dateOfBirth<=>code/UI birthday (type=date, match on birth)
4. DB PersonAddress<=>code/UI address (similar, same LAT)
5. code getPatientDetails<=>code queryPatientDetails (PatientDetails have the words in common, i.e., exact match; get and query are synonyms)

In the first correlation shown above, the database or data store element 'Person' and application code element 'Person' are correlated to user interface element 'Patient', for example, based on the discovery analysis in the present disclosure that patient is of type person and other possible similarity discovery. In the second correlation, the database or data store element 'fullName' is correlated with the user interface input element 'Name', for example, based on analysis that 'full name' and 'name' are determined to be similar based on a similarity threshold. In the third correlation, the database or data store element 'dateOfBirth' is correlated with the user interface element 'Birthday', for example, based on analysis that both elements have the same type, date, and there is an exact match on the part of the word 'birth'. In the fourth correlation, the database or data store element 'PersonAddress' is correlated with the user interface element 'Address', for example, based on analysis that those words have similarity. In the fifth correlation, the code element, a method call 'getPatientDetails' of a servlet layer is correlated with 'queryPatientDetails' of a remote access service, for example, based on analysis that the elements have a portion of the words in common, i.e., 'PatientDetails', and another portion of the words are determined to be similar, i.e., 'get' and 'query' are determined to be similar based on a similarity threshold.

The following shows example annotations that can be made to a code according to one embodiment of the present disclosure. Table 1 shows a Java API for RESTful Services (JAX-RS) example. In the code shown in Table 1, a methodology of the present disclosure may map calls to "/users" to "UserRestService.getUser( )" and calls to "/users/vip" to "UserRestService.getUserVIP( )" via the @Path annotation

TABLE 1

```
@Path("/users")
public class UserRestService {
    @GET
    public Response getUser( ) {
        return Response.status(200).entity("getUser is called").build( );
    }
```

TABLE 1-continued

```
    @GET
    @Path("/vip")
    public Response getUserVIP( ) {
        return Response.status(200).entity("getUserVIP is called").build(
        );
    }
}
```

Table 2 shows a JPA example. In the code example shown in Table 2, a methodology of the present disclosure may search for @Entity/@Table annotations for tables and @Basic or @Column annotations for columns.

TABLE 2

```
JPA example:
@Entity
@Table(name="PATIENT")
public class Patient implements Serializable {
    @Temporal( TemporalType.DATE )
    @Column(name="DATE_OF_BIRTH", nullable=false)
    public Date getDateOfBirth( ) {
        return this.dateOfBirth;
    }
    @Column(length=10)
    public String getAge( ) {
        return this.age;
    }
}
```

Table 3 shows Web.xml example, which instructs, for URL patterns starting with '/process', route to 'AdvancedProcessingRESTServlet'.

TABLE 3

```
<servlet>
    <servlet-name>AdvancedProcessingRESTServlet</servlet-name>
    <servlet-class>
        com.xxx.yyy.solutions.oncology.research.preprocess.AdvancedProcessingRESTServlet
    </servlet-class>
</servlet>
<servlet-mapping>
    <servlet-name>AdvancedProcessingRESTServlet</servlet-name>
    <url-pattern>/process/*</url-pattern>
</servlet-mapping>
```

A methodology of the present disclosure in one embodiment provides the ability to trace data flow across boundaries between components, where those components may be in different computer languages. A natural language processing technique may be used analyze an application code and to make the necessary correlations both within components and at those boundaries. The methodology of the present disclosure, in one aspect, includes capability to discover metadata from an application that has grown or altered over time and does not have a highly or similarly structured format. The methodology of the present disclosure in one embodiment connects or links the UI elements to the data stores they come from while crossing code boundaries.

Figure 2:
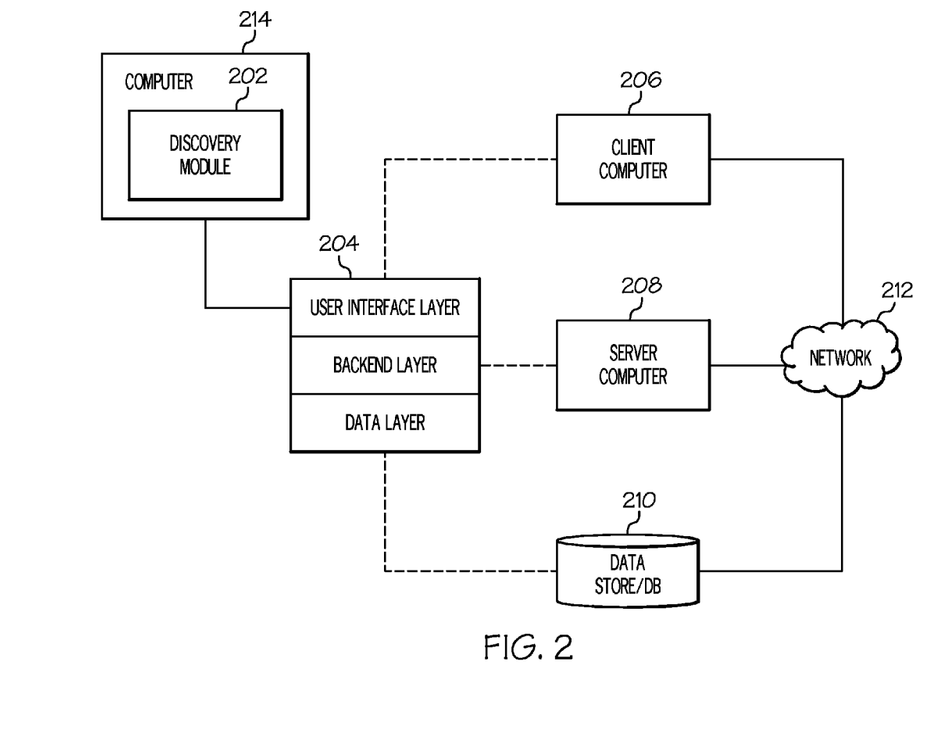
FIG. 2 is a diagram showing components of a system for automatic discovery of code and data store that populate a user interface element in one embodiment of the present disclosure.

FIG. 2 is a diagram showing logical components of a system for automatic discovery of application components, e.g., code and data store, that populate a user interface element in one embodiment of the present disclosure. An application may include a user interface layer, a backend layer and a data layer that together perform functionalities of the application. For instance, the user interface layer may include code that may be for running on a client computer

206. A backend layer may include code for running on a server computer 208. A data layer may include a database or data store 210, which may be local to the server computer 208 or connected remotely via a network 212. The client computer 206 and the server computer 208 may be configured to communicate via a network 212. In another aspect, the application 204 may be configured to run on a single computer. For example, the user interface layer, backend layer and data layer may reside locally on a single computer and configured to operate therefrom.

A discovery module 202 may be provided that executes or is executable on a computer 214. The computer 214 can be the same computer as the one that might be running the user interface layer, for example, the computer at 206 or the backend layer, for example, the computer shown at 208, or the computer 214 may be another computer.

The discovery module 202 analyzes the application, for example, the user interface layer and discovers the input fields or elements of a user interface of the user interface layer. As described above, the discovery module 202 may build a directed graph from an application code implementing a backend layer of an application. The discovery module may also identify a code element in the application code that matches an input element of a user interface of the application. The discovery module may also identify a data store element of a data store implementing data layer of the application that matches the input element. For the input element, the discovery module may build a map of trees tracing through the directed graph based on the code element and the data store element that are identified. The discovery module may further group the map of trees based on at least matching of annotations of the trees in the map, a similarity of begin and end points of the trees in the map and matching of the end points of the trees in the map. The map of trees includes the application components visited by the processor for populating the input element of the user interface.

Figure 4:
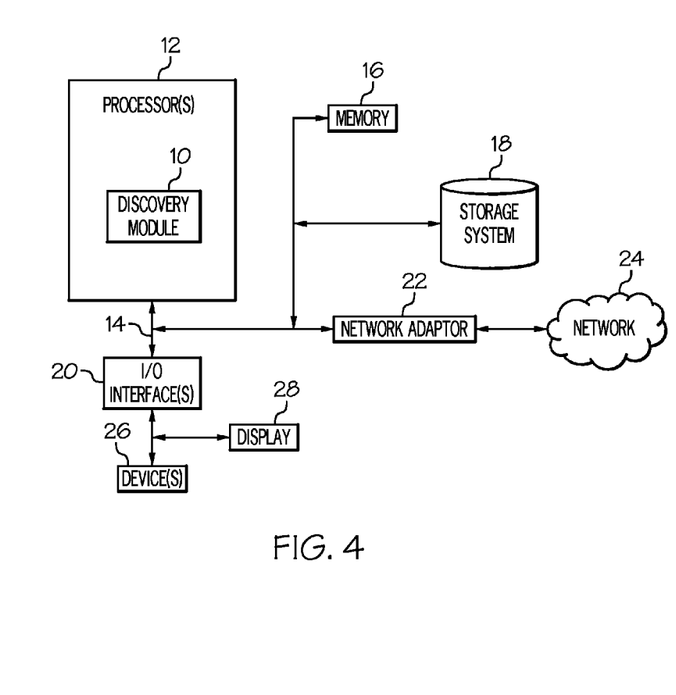
FIG. 4 illustrates a schematic of an example computer or processing system that may implement an automatic discovery system in one embodiment of the present disclosure.

FIG. 4 illustrates a schematic of an example computer or processing system that may implement an automatic discovery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of automatically discovering application components that populate a user interface element, comprising:
   building, by a processor, a directed graph from an application code implementing a backend layer of an application;
   identifying, by the processor, a code element in the application code that matches an input element of a user interface of the application;
   identifying, by the processor, a data store element of a data store implementing data layer of the application that matches the input element;
   for the input element, building, by the processor, a map of trees tracing through the directed graph based on the code element and the data store element that are identified; and
   grouping, by the processor, the map of trees based on at least matching of annotations of the trees in the map, a similarity of begin and end points of the trees in the map and matching of the end points of the trees in the map,
   wherein the map of trees includes the application components the processor visited for populating the input element of the user interface;
   building, by the processor, a visualization based on the map of trees; and
   responsive to displaying a user interface field associated with the input element, displaying the visualization on a display device.

2. The method of claim 1, wherein the identifying a code element in the application code that matches an input element of a user interface of the application comprises using a natural language processing technique to find the code element that matches the input element and assigning a similarity score to the code element based on a degree of matching.

3. The method of claim 2, wherein responsive to finding more than one code element matching the input element, selecting the code element with highest similarity score to use in the building of the map of trees.

4. The method of claim 1, wherein the identifying a data store element of a data store implementing data layer of the application that matches the input element comprises using a natural language processing technique to find the data store element that matches the input element and assigning a similarity score to the data store element based on a degree of matching.

5. The method of claim 4, wherein responsive to finding more than one data store element matching the input element, selecting the data store element with highest similarity score to use in the building of the map of trees.

6. The method of claim 1, wherein the method is performed for a plurality of input elements, and the map of trees is built for each of the plurality of input elements.

7. A system for automatically discovering application components that populate a user interface element, comprising:
   a processor; and
   a discovery module executing on the processor and operable to build a directed graph from an application code implementing a backend layer of an application,
   the discovery module further operable to identify a code element in the application code that matches an input element of a user interface of the application;
   the discovery module further operable to identify a data store element of a data store implementing data layer of the application that matches the input element;
   for the input element, the discovery module further operable to build a map of trees tracing through the directed graph based on the code element and the data store element that are identified,
   the discovery module further operable to group the map of trees based on at least matching of annotations of the trees in the map, a similarity of begin and end points of the trees in the map and matching of the end points of the trees in the map,
   wherein the map of trees includes the application components visited by the processor for populating the input element of the user interface;
   the discovery module further operable to build a visualization based on the map of trees, and responsive to displaying a user interface field associated with the input element, the discovery module further operable to display the visualization on a display device.

8. The system of claim 7, wherein the discovery module identifies the code element by at least using a natural language processing technique to find the code element that matches the input element and assigning a similarity score to the code element based on a degree of matching.

9. The system of claim 8, wherein responsive to finding more than one code element matching the input element, the discovery module selects the code element with highest similarity score to use to build the map of trees.

10. The system of claim 7, wherein the discovery module identifies the data store element by at least using a natural language processing technique to find the data store element that matches the input element and assigning a similarity score to the data store element based on a degree of matching.

11. The system of claim 10, wherein responsive to finding more than one data store element matching the input element, the discovery module selects the data store element with highest similarity score to use in the building of the map of trees.

12. A computer readable storage medium storing a program of instructions executable by a machine to perform a method of automatically discovering application components that populate a user interface element, the method comprising:
   building a directed graph from an application code implementing a backend layer of an application;
   identifying a code element in the application code that matches an input element of a user interface of the application;
   identifying a data store element of a data store implementing data layer of the application that matches the input element;

for the input element, building a map of trees tracing through the directed graph based on the code element and the data store element that are identified; and grouping the map of trees based on at least matching of annotations of the trees in the map, a similarity of begin and end points of the trees in the map and matching of the end points of the trees in the map, wherein the map of trees includes the application components visited for populating the input element of the user interface;

building, by the processor, a visualization based on the map of trees; and responsive to displaying a user interface field associated with the input element, displaying the visualization on a display device.

13. The computer readable storage medium of claim 12, wherein the identifying a code element in the application code that matches an input element of a user interface of the application comprises using a natural language processing technique to find the code element that matches the input element and assigning a similarity score to the code element based on a degree of matching.

14. The computer readable storage medium of claim 13, wherein responsive to finding more than one code element matching the input element, selecting the code element with highest similarity score to use in the building of the map of trees.

15. The computer readable storage medium of claim 12, wherein the identifying a data store element of a data store implementing data layer of the application that matches the input element comprises using a natural language processing technique to find the data store element that matches the input element and assigning a similarity score to the data store element based on a degree of matching.

16. The computer readable storage medium of claim 15, wherein responsive to finding more than one data store element matching the input element, selecting the data store element with highest similarity score to use in the building of the map of trees.

17. The computer readable storage medium of claim 12, wherein the method is performed for a plurality of input elements, and the map of trees is built for each of the plurality of input elements.

* * * * *